(12) United States Patent
Kramer et al.

(10) Patent No.: US 8,463,429 B2
(45) Date of Patent: Jun. 11, 2013

(54) METHOD AND DEVICE FOR PRODUCING AND LOADING OF BUNDLES OF PRINTED MATERIAL

(75) Inventors: Michael Kramer, Aarau (CH); Thomas Kuenzli, Basel (CH); Hans Rothenbuehler, Staufen (CH)

(73) Assignee: Mueller Martini Holding AG, Hergiswil, Hergiswil (CH)

( * ) Notice: Subject to any disclaimer, the term of this patent is extended or adjusted under 35 U.S.C. 154(b) by 315 days.

(21) Appl. No.: 12/901,284

(22) Filed: Oct. 8, 2010

(65) Prior Publication Data

US 2011/0087366 A1    Apr. 14, 2011

(30) Foreign Application Priority Data

Oct. 9, 2009    (EP) .................................... 09012810

(51) Int. Cl.
*G06F 7/00* (2006.01)
*B07C 7/00* (2006.01)
*B07C 5/02* (2006.01)

(52) U.S. Cl.
USPC ........... 700/230; 700/220; 700/224; 209/630; 209/540; 209/542

(58) Field of Classification Search
None
See application file for complete search history.

(56) References Cited

U.S. PATENT DOCUMENTS 4,803,634 A * 2/1989 Ohno et al. ................... 700/213

* cited by examiner

*Primary Examiner* — Yolanda Jones
(74) *Attorney, Agent, or Firm* — Schwabe, Williamson & Wyatt, P.C.

(57) ABSTRACT

The invention relates to a method and device for producing and loading of bundles of printed material (18, 19) corresponding to respective specified consolidated orders (20; 30; 23, 33; 26; and 36) consisting of a specified number of preferably similar types of printed material that belong to a shipment (16) allocated to a means of transportation (11, 11'), with which bundles of printed material of shipment (16) can be produced on at least two production lines (2, 3) that can be operated independently of each other according to the consolidated orders (20; 30; 23, 33; 26; 36) are conveyed to a loading station (11) and are loaded there, wherein the production lines (2, 3) are automatically controlled by the shipment data corresponding to the production of the bundles of printed material (18, 19) depending upon the individual consolidated orders (20; 30; 23, 33; 26; 36) of the shipment (16).

15 Claims, 4 Drawing Sheets

METHOD AND DEVICE FOR PRODUCING AND LOADING OF BUNDLES OF PRINTED MATERIAL

CROSS REFERENCE TO RELATED APPLICATIONS

Figure 1:
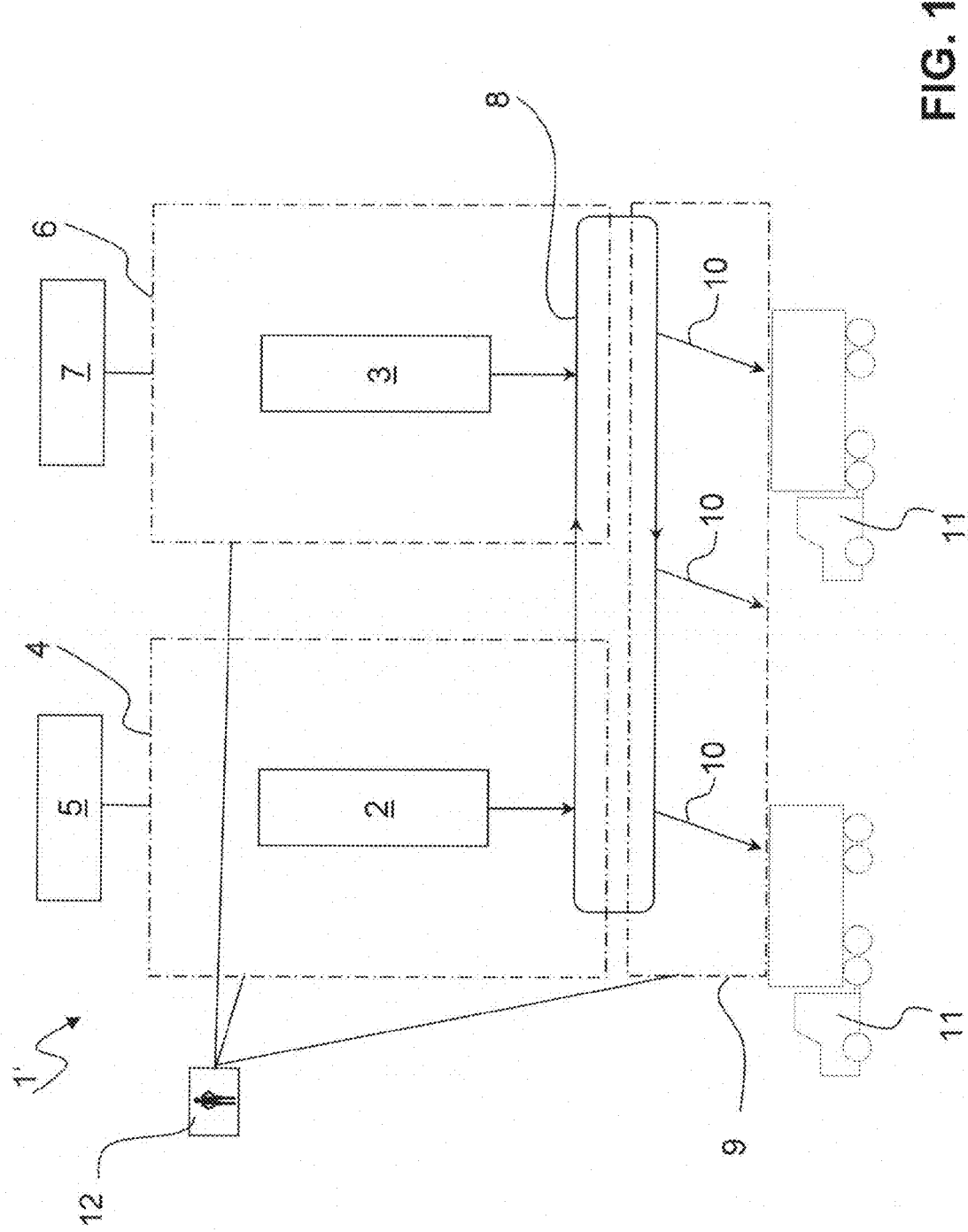

The present application claims international priority under 35 U.S.C. §119 to co-pending European Patent Application No. 09 012 810.9-2221 filed 9 Oct. 2009, the entire content and disclosure of which is hereby incorporated by reference in its entirety.

The invention relates to a method and a device for producing and loading of at least one shipment that belongs to and is allocated to a means of transportation and respectively corresponding specified consolidated orders of a specified number of bundles of printed material that preferably consist of similar types of printed material, in which at least two bundles of printed material of at least one shipment are produced on at least two product lines that can be operated independently of each other and are assigned to at least one shipment and conveyed to a loading station and are loaded there.

Modern printing centers produce a multiplicity of different types of printed material. Types of printed material are for example newspapers, periodicals, brochures, catalogs, books, and such. Different publications are produced from one specific type of printed material, where several issues, also called editions, can sometimes be produced from one publication. A publication is a daily newspaper XY, for example, of which frequently several editions that are different from each other are published. In this manner, different regional interests can be considered, for example. Or a furniture catalog that is designated for several countries represents a publication which is produced in country-specific issues and/or editions. In accordance with the specifications for distribution, the same or different types of printed material must be consolidated into bundles of printed material containing a pre-determined number of printed material, be loaded into a means of transportation and be conveyed with this to the point of destination. It is also conceivable that the bundles of printed material that belong to one shipment are placed into intermediate storage before being loaded into means of transportation.

The bundles of printed material, such as packages, rolling carts, baskets, pallets, boxes, rails, or any other suitable containers, are loaded into means of transportation, e.g. delivery vans, trucks, or rail cars, for conveyance to the point of destination. The cargo of a means of transportation normally consists of a multiplicity of bundles of printed material, each of which contains only one publication or edition of a type of printed material. The cargo itself, however, can contain a multiplicity of different types of printed material, publications and editions. The bundles of printed material that belong to one shipment and are of the same type of printed material, publication, or edition, are described in one order which states both the number as well as the type of printed material. The orders of one shipment constitute one entity and are therefore called consolidated orders. The bundles of printed material are produced in printing centers on at least two production lines that can be operated independently of each other, in which each production line for producing bundles of printed material can be operated by different types of printed material or different publications and/or editions.

To control the production of the bundles of printed material, the consolidated orders that are assigned to the individual shipments are distributed between the available production lines. Then, one of the employees in the shipping room for distributing the bundles of printed material to the individual means of transportation, the so-called shipping clerk, determines the chronological sequence for producing the individual bundles of printed material so that the bundles of printed material of one shipment assigned to the means of transportation arranged at the loading stations arrive there in a chronological sequence so that they can be loaded into the means of transportation. The shipping clerk therefore also manually determines the chronological sequence of the production of the individual bundles of printed material on the different production lines and monitors the production and the transportation of the bundles of printed material to the loading stations.

It has been shown that this known method can frequently result in unsatisfactory utilization of the production lines and sometimes cause a backup of bundles of printed material upstream of the individual loading stations. In addition, the shipping clerk has to spend quite a significant amount of time on coordination.

In view of these problems in the prior art, the object of the invention has to indicate a method for producing and loading bundles of printed material, with which by optimal utilization of the production capacities, reliable and systematic loading of bundles of printed material is possible, and to provide a device that can be operated for performing appropriate processes.

From a procedural point of view, within the scope of the invention this problem is solved by a development of the known methods, which is essentially characterized in that the production lines for producing the bundles of printed material are controlled automatically depending on shipment data that represent at least one shipment of the individual consolidated orders, wherein the chronological sequence of the consolidated orders is preferably determined in dependence of the shipment data corresponding to the production of the bundles of printed material. The invention teaches that the control is performed by a central common control device for the production lines.

In this context, the invention draws on the knowledge that the shipment data that are required anyway for the production and the loading of the bundles of printed material can also be used for the control of the correct sequence of the production lines and/or to determine the chronological sequence of producing the individual bundles of printed material of consolidated orders for a shipment on the individual production lines.

Insofar as there are data available in a control device that can still represent also the production characteristics of the production lines, a production sequence for the bundles of printed material assigned to the individual loads can be generated automatically, if necessary, by the automatic control of the production lines based upon the shipment data, with which on the one hand a good utilization of the production capacities of the individual production lines can be ensured, and on the other the concurrent conveyance of several bundles of printed material that belong to one shipment to a loading station can be prevented effectively. Therefore the object of determining the chronological sequence of the production of individual bundles of printed material which is otherwise assigned to the shipping clerk in the shipping room is now solved by a central common control device for the production lines, as a result of which the coordination and synchronization of the production and loading is possible for the entire shipping room. For this purpose it is merely required that the shipment data are provided in suitable data formats to a central control device. From these shipment data, the different types of printed material and/or the different publications or editions of one shipment are extracted and for each type of printed material and/or for each publication or for each edition, a consolidated order is preferably created, according to which the bundles of printed material are to be produced. The allocation of the consolidated orders to a loading station is performed for all production lines, so that all bundles of printed material of a shipment produced in accordance with the consolidated orders during the implementation of methods as taught by the invention can be allocated to the same loading station.

With another embodiment of the invention it is also possible to change the loading station still during the production of the consolidated orders and/or during the production of the bundles of printed material which belong to the shipment.

Within the scope of the invention, processes are also considered that can be implemented, in which the chronological sequence of the production of the respective bundles of printed material of the individual consolidated orders is specified. Such chronological sequence can be input into a control device that can be used for implementing methods as taught by the invention, for example, by importing the data by means of a suitable interface. The respective data can contain a sequence of the type of printed material that can be produced on the production lines. Then the bundles of printed material corresponding to the individual consolidated orders will be produced in accordance with this specified sequence. Specifically, these sequential data can contain individual printed material in the form of data to identify reference products. In this case, during the implementation of methods as taught by the invention, a reference product can be determined from the printed materials of a shipment and the bundles of printed material of the consolidated order that corresponds to the reference product can be produced first and be loaded.

As already addressed previously, it is particularly useful within the scope of the invention, if the chronological sequence of producing the bundles of printed material corresponding to the consolidated orders can be controlled depending on the operational status of the production lines, and thus to achieve optimal utilization of the production capacities of the individual production lines. In this embodiment of the invention, the simultaneous delivery of various bundles of printed material of the different consolidated orders of a shipment to one loading station can be prevented effectively, if an enabling signal is generated upon reaching a predetermined production status of a corresponding bundle of printed material from a preceding consolidated order of the same shipment, which causes a production signal to be generated which causes the generation of a production signal and wherein the production signal initiates the production of an additional bundle of printed material of the shipment on a production line. In this context, the production signal can be a datagram which represents the status of a production line.

In this embodiment of the invention, enabling signals are therefore generated from the individual production lines which are processing the consolidated orders and only after the generation of a respective enabling signal, the production of the bundles of printed material corresponding to the next consolidated order of the shipment is initiated by the generation of a respective production signal and by applying this production signal on a corresponding production line. For this purpose, the simultaneous conveyance of individual bundles of printed material to a loading station can be especially prevented effectively, in that the enabling signal is generated only when the production of the bundle of printed material that corresponds to the consolidated order is completed. An especially good degree of utilization of the production capacities of the production lines can be achieved, however, if the enabling signal is already created at the time when a predetermined percentage of the bundle of printed material has been produced. In this case, a temporal overlap during the production of the individual bundles of printed material which correspond to the consolidated orders is permitted.

After generating an enabling signal in the embodiment of the invention just described, the production of corresponding bundles of printed material from a consolidated order of the same shipment must be initiated by generating a respective production signal and applying this production signal on a production line. In case that at least two production lines for producing the respective bundles of printed material of one consolidated order of the shipment are available, it is useful if a ready signal is generated, as soon as a production line has obtained a suitable operational status for producing bundles of printed material. The ready signal which indicates the availability of a production line is generated in addition to the enable signals, as soon as the respective production line displays the "ready for operation" operational status.

In the latter embodiment of the invention described, a production signal for an operational production line to produce bundles of printed material of the shipment can be generated in response to the enable signal, if a ready signal exists for this production line and a bundle of printed material which can therefore be produced according to the shipment data that are updated during the production of the bundles of printed material in accordance with the production status are still required for the shipment. If a production signal for a consolidated order is generated only after the generation of an enable signal for a preceding consolidated order of the same shipment, the simultaneous delivery of two or more bundles of printed material from different consolidated orders of the same shipment to the respective loading station can be reliably prevented, even if the production sequence of the individual consolidated orders of the shipment is not established beforehand, but is determined in dependence of the availability of the production lines when the enable signals are received.

As can be derived from the foregoing explanation of this embodiment of the invention, the shipment data which represent the consolidated orders of the shipment are continuously updated during the production of the bundles of printed material that correspond to the consolidated orders. Alternatively or in addition, the respective consolidated orders can also be deleted from the entity and/or be extracted from the sequence that is controlled by the control device.

In view of the desired optimal utilization of the production capacities of the production lines while at the same time prevent a potential overloading of individual loading stations and to obtain a maximum uniform distribution of the consolidated orders to the production lines, it is particularly preferred, if the production signal in response to the enable signal is generated for those production lines that are available for production of bundles of printed material that are still missing, for which the ready signal exists for the maximum time for the generation of the enable signal. In this manner, it is avoided that individual production lines are not even "assigned" at all the production of bundles of printed material that belong to individual consolidated orders, and thus achieve a uniform degree of utilization of the individual production lines.

Methods as taught by the invention are already even usable advantageously if bundles of printed material of consolidated orders for only one shipment are to be produced synchronized temporally with two or multiple production lines. The invention can be used particularly advantageously, however, if bundles of printed material corresponding to the consolidated orders can be produced simultaneously for at least two shipments and are loaded on the loading stations that are assigned to these shipments, wherein the loading stations assigned to the shipments can still be changed even during the production of the respective bundles of printed material. In this case, two, three, or more shipment data sets are available that are preferably updated continuously during the production, by means of which the chronological sequence of the production of consolidated orders assigned to individual, or to different shipments, if necessary, is controlled in accordance with the bundles of printed material. Here too, in addition to the static control described initially, a dynamic control of the production line depending on the assigned enable signals assigned to the individual shipments and on the individual ready signals assigned to the individual product lines can be realized, based upon a predetermined chronological sequence. With regard to the monitoring of methods as taught by the invention, it was found to be advantageous, if a visual display is generated that represents the production and/or loading status of bundles of printed material that correspond to at least one shipment of the consolidated orders. This visual display can be on a monitor, for example, that has been allocated to a data processing system to perform the control as taught by the invention. In this context, it is useful, if each individual production line has been allocated its own monitor for monitoring the production of printed material.

As can be derived from the above explanations of methods as taught by the invention, a device for implementing such methods with at least two production lines that are independent of each other and that can be operated for producing bundles of printed material that consist of printed material and one control device that can be operated for the control of the production lines is essentially characterized in that the control device for the automatic determination of the chronological sequence of the production of corresponding specified bundles of printed material that belong to a shipment allocated to means of transportation on one of the loading stations can be operated in dependence of the shipment data representing the individual consolidated orders of the shipment. In this context, the device as taught by the invention can also be used for the simultaneous production of consolidated orders for at least two shipments, if corresponding shipment data are available as a basis for the control of the production lines.

The production lines of devices as taught by the invention can be suitable for operation for producing bundles of printed materials consisting of at least two printed material that are distinctive of each other. The chronological sequence of a device as taught by the invention can be determined according to a particular sequence specified by the control device that is transmitted by means of an interface of the control device. In addition, or alternatively, the use of devices as taught by the invention are considered in which the chronological sequence can be determined in dependence of ready signals representing the availability of the production lines and from the enable signals representing the production status of the corresponding bundles of printed material of the consolidated orders of the shipment. In this case, the production lines for the simultaneous production of bundles of printed material can be controlled for at least two shipments.

Figure 2:
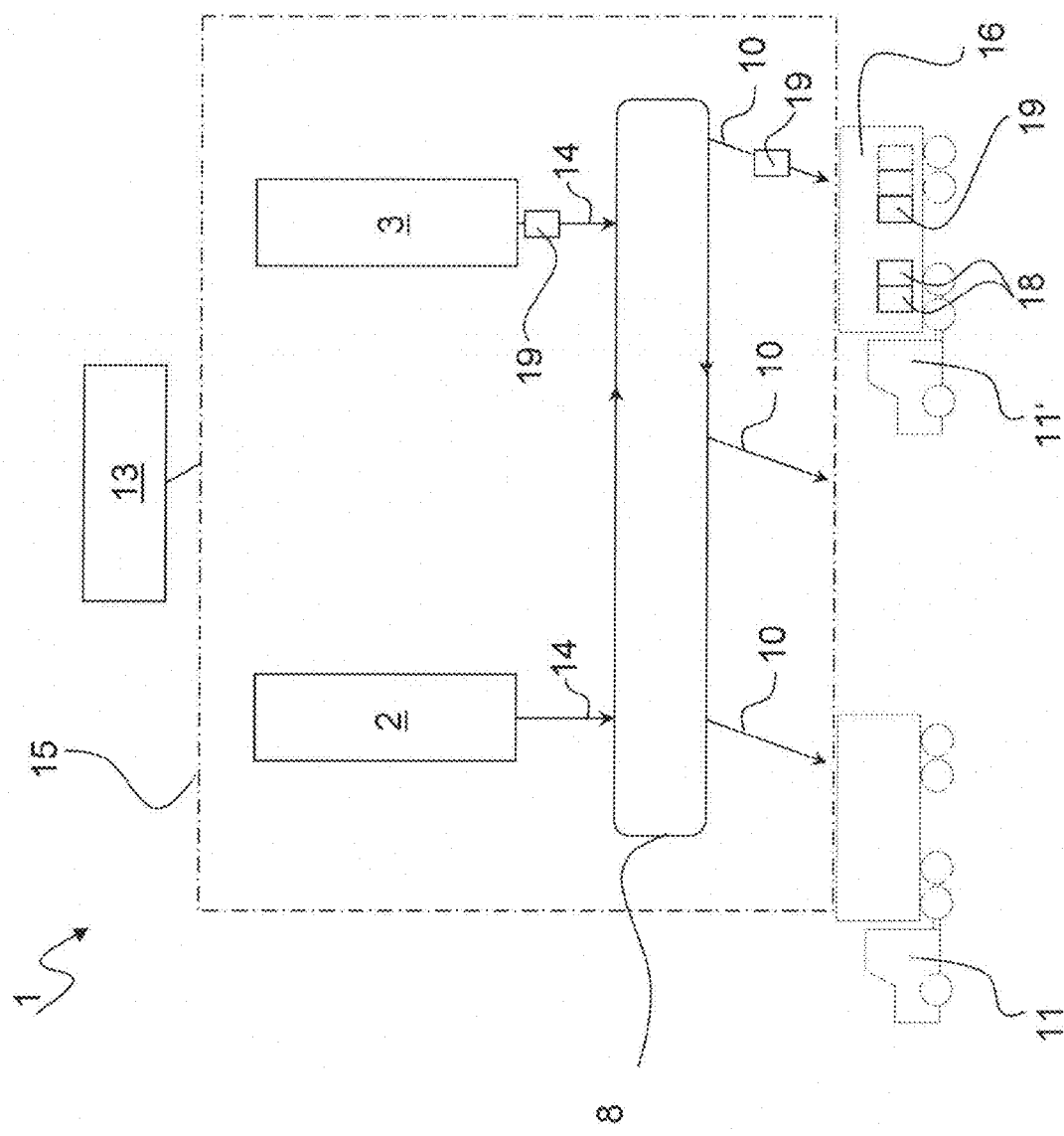
Figure 3:
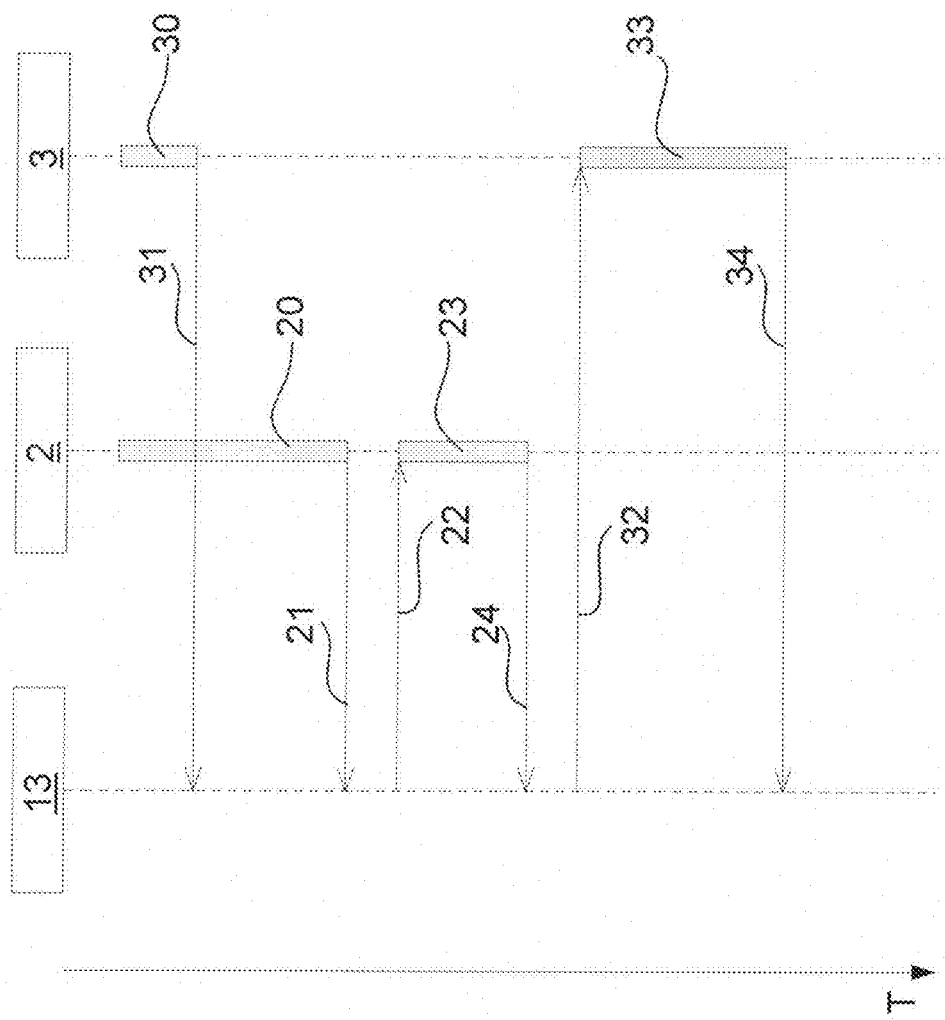
Figure 4:
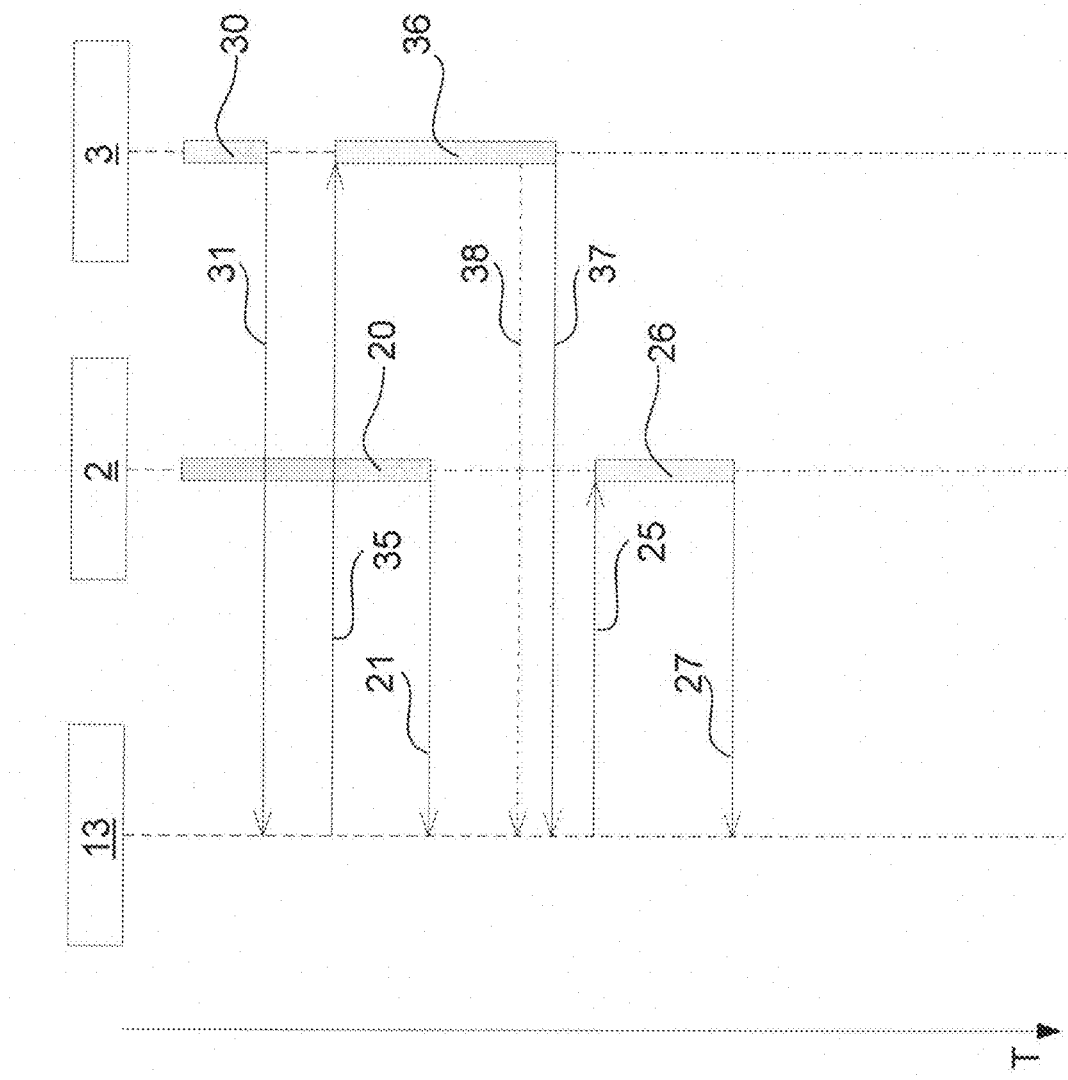

In the following, the invention is explained by reference to the drawing, which is not referred to in detail with respect to all details that are essential to the invention and any particulars that are particularly emphasized in the description. The drawing shows:

FIG. 1: is a schematic representation of a device according to prior art,

FIG. 2: is a schematic representation of a device as taught by the invention,

FIG. 3: is a diagram representing the embodiment of a first embodiment of methods as taught by the invention, and FIG. 4: is a diagram representing the embodiment of a second embodiment of methods as taught by the invention.

FIG. 1 shows a shipping room 1' with a device according to prior art, with which printed material that are not represented can be produced with two production lines 2, 3. The production line 2 can be operated for producing a first printed material and the production line 3 for producing a second, wherein each of the production lines 2, 3, can also still be operated for producing other printed material. Is also conceivable to have more than two production lines 2, 3. The production line 2 is allocated to a first production area 4, which is monitored and controlled by a control device 5. The production line 3 is arranged in a second production area 6 that is controlled by a control device 7. The printed material produced from the production lines 2, 3, newspapers for example, are consolidated into groups and supplied as packages to a conveying system 8. Besides packages, also additional bundles of printed material for simplified handling and for protection of the printed material are known, such as rolling carts, baskets, pallets, boxes, rails, or any other suitable containers. The conveying system 8 conveys the individual, preferably similar bundles of printed material containing the printed material to loading stations 10, at which the printed material are loaded into means of transportation 11. Normally, delivery vans, trucks, or rail cars are used as a means of transportation 11. In order to prevent backups of bundles of printed material in a loading area 9 that contains the conveying system 8 and the loading stations 10, a shipping clerk 12 endeavors to coordinate the chronological sequence of the orders produced on the production lines 2, 3, such that the bundles of printed material of a shipment allocated to the means of transportation 11 at the loading stations arrive in a consecutive chronological order. The loading of the bundles of printed material at the loading station 10 into a means of transportation 11 should thus be systematic and without backup. With an increasing number of production lines, loading stations, and different printed material that are to be produced, the coordination that can be done by the shipping clerk 12 reaches its limits.

The device 1 as taught by the invention represented in FIG. 2 also includes two production lines 2, 3, that are controlled by a control device 13 according to specified shipment data for producing bundles of printed material 18, 19, consisting of a specified number of preferably similar printed material. The control device 13 comprises a programmable unit such as an electronic data processing unit, for instance, to which the shipment data can be supplied by means of an interface and can transfer the signals and data to the production lines and receive them from the production lines. The bundles of printed material 18, 19, that are produced by the production lines 2, 3, according to the shipment data are conveyed with a conveying system 8 to the loading stations 10 at which the bundles of printed material 18, 19, are loaded into means of transportation 11. The conveying system 8 can be designed both as a simple belt conveyor system as well as a fully automatic conveyor system with several feed points 14 and loading stations 10 for bundles of printed material 18, 19.

The control device 13 is initially supplied with the shipment data that represent the individual consolidated orders which belong to one or several shipments, by means of an interface. The shipment data therefore particularly contain information regarding the number and type of the bundles of printed material that belong to the shipment as well as the number of the printed material for each bundle of printed material. These data are provided to the control device in a data format that can be processed by the program operated on the control device. The control device furthermore has the information available as to which product line is ready for which printed material that can be produced and/or which product line can be operated for which printed material. The control device 13 thereupon controls automatically the one production line for producing the consolidated order that has been represented by the shipment data, which can be operated for producing the printed material that is described by the respective consolidated order. Other production lines are also controlled from the control device for producing additional consolidated orders for the same or for another shipment, if these production lines can be operated for producing the printed material of these consolidated orders. In the following it is actually described, according to which criteria the sequence is determined in which the control device controls the individual product lines for the production of bundles of printed material.

In addition to the at least two production lines 2, 3, the control device 13 for all production lines controls also the conveying system 8 and the at least two loading stations 10 of an expanded production area 15. As the example in FIG. 2 represents, the shipment 16 of the means of transportation 11' consists of several bundles of printed material 18, which can be produced on the production line 2 and are conveyed by means of the conveying system 8 to the loading station 10 allocated to the means of transport 11', for example. Bundles of printed material 19 produced by the production line 3 have already been provided to the shipment 16 or are en route to the means of transportation 10'.

The production lines 2, 3, have different operating states, which influence the chronological sequence of producing the bundles of printed material 18, 19. A ready signal is transmitted to the control device 13, for example, as soon as the respective production line has the "ready for operation" operational status.

In the following, a method as taught by the invention is explained by means of FIG. 3, in which the specified sequence of the consolidated orders to be produced according to the shipment data is fixed. With the method represented by means of FIG. 3, printed material for a shipment 16 are to be produced by the production line 2 pursuant to a first consolidated order 23 and printed material to be subsequently produced by production line 3, are to be produced by a second consolidated order 33. The chronological sequence of the production according to the time axis T, is described as follows. At the start of the production, both the production line 2 as well as the production line 3 are provided shipment data, which have not to be explained in greater detail here, for the production of printed material. As soon as a respective consolidated order 30 has been completed on the production line 3, an enable signal 31 is generated and applied on control device 13. In view of the specified production sequence of the consolidated orders 23 and 33, the production line 3 responding to the enable signal 31 is however not yet controlled for the production of bundles of printed material in accordance with the subsequent consolidated order 33. At the beginning of the production, a consolidated order 20 is processed on the production line 2. As soon as this consolidated order 20 has been completed, an enable signal 21 is generated. With regard to the specified production sequence, after which initially the consolidated order 23 is to be processed from the bundles of printed material that can be produced by the production line 2, before the consolidated order 33 can be processed with the bundles of printed material that can be produced by the production line 3, in response to the enable signal 21, a production signal 22 from the control device 13 is applied to production line 2 and the production of the bundles of printed material 18 represented in FIG. 2 for the consolidated order 23 is started. As soon as the consolidated order 23 is completed, an enable signal 24 is applied to the control device 13 and only in response to this enable signal 24, a production signal 32 is applied to production line 3 so as to initiate the production of bundles of printed material 19 for the consolidated order 33. After the completion of the bundles of printed material that belong to consolidated order 33, an enable signal 34 is applied on the control device 13.

No intervention of a shipping clerk is required for the production of the consolidated orders 23, 33, according to specified production sequences according to respective sequential data. It is rather sufficient, if the existing shipment data and sequential data are transmitted to the control device 13, and are input into same and/or are stored in same.

In the following, a process management is described by means of FIG. 4, wherein the sequence of the production of consolidated orders has not been specified on a fixed basis. Rather, it is only specified that for a shipment 16, first bundles of printed material 18 corresponding to a consolidated order 26 from printed material that can be produced by production line 2, and second bundles of printed material 19 corresponding to a consolidated order 36 that can be produced by production line 3, are to be produced. In FIG. 2, the shipment 16 with the two consolidated orders 26 and 36, is represented simplified in on one of the two means of transport 11" standing on one of the two loading stations 10. At the start of the production, ready signals exist for the two production lines 2 and 3, i.e. the production lines 2, 3, can start with the production of bundles of printed material after the transmission of an enable signal. Pursuant to FIG. 4, the production lines 2 and 3 are busy with the production of bundles of printed material according to the consolidated orders 20 and 30 for other shipments. After completing the consolidated order 30, an enable signal 31 from the production line 3 is applied on the control device 13. In response to the enable signal 31, a production signal 35 for the production of the consolidated order 36 is immediately applied on the production line 3. During the production of the bundles of printed material 19 of the consolidated order 36, the consolidated order 20 on the production line 2 is completed and a corresponding enable signal 21 is applied on the control device 13. The production signal 25 for initiating the production of bundles of printed material 18 for the consolidated order 26, however, is only applied from the control device 13 on the production line 2 after the input of an enable signal 37, which represents the completion of the consolidated order 36 by the production line 3, in order to initiate the production of bundles of printed material 18 by the production line 2 in this manner. After completing the consolidated order 26, an enable signal 27 from the production line 22 is applied again on the control device 13. It is also conceivable that an enable signal 38 is transmitted to the control device 13 already prior to the completion of the consolidated order 36, for example, when 80% of the consolidated order 36 has been produced. In the sequence, the production signal 25 can be applied earlier on production line 2 then presented in FIG. 4, so that the bundles of printed material 18, 19, of the two consolidated orders 26, 36, can be generated in a significantly shorter time and with less delays of production lines 2, 3, than in the sequence represented in FIG. 3. Such pre-adjustments can be supplied to the control device by means of an input device, such as a keyboard. By a program operated on a computer of the control device, input masks can be provided on a display device such as a monitor, for example, for the input or change of sequential data for marking a consolidated order to be produced first as a reference point and/or to determine which percentage of a consolidated order must be produced, so that an enable signal from the corresponding production line is sent to the control device. In this manner it can also be determined whether the consolidated orders that belong to a shipment are to be produced according to a fixed specified sequence, or whether the sequence is to be determined by the control device for optimizing the utilization of the production lines as described above.

The invention is not limited to the embodiments represented by means of the drawing. Rather, it is possible that consolidated orders can be simultaneously processed for more than two shipments. It is also possible, that means of transportation 11, 11' are changing from one loading station 10 to a next loading station 10 during the production of the consolidated orders 20, 23, 26, 30, 33, 36.

The invention claimed is:

1. A method for producing and loading of bundles of printed products that belong to at least one shipment assigned to a means of transportation, the bundles of printed products each consisting of a given number of printed products in correspondence with specified consolidated orders the method comprising the following steps:
    the bundles of printed products of the at least one shipment are produced on at least two production lines that can be operated independently of each other;
    the bundles of printed products are conveyed to a loading station allocated to the at least one shipment;
    the bundles of printed products are loaded at the loading station; and
    the production lines for producing the bundles of printed products are automatically controlled by a central control device for all production lines on the basis of shipment data representing the individual consolidated orders of the at least one shipment,
    wherein, when reaching a specified production status of a bundle of printed products corresponding to a preceding consolidated order of the same shipment on a first production line, an enable signal is generated, which causes the generation of a production signal which initiates the production of a further bundle of printed products of the shipment on another production line.

2. A method according to claim 1, wherein the bundles of printed products corresponding to the consolidated orders are produced according to a specified chronological sequence.

3. A method according to claim 2, wherein the chronological sequence of the production of the bundles of printed products corresponding to the consolidated orders is controlled depending upon an operating status of the production lines.

4. A method according to claim 1, wherein a ready signal is generated as soon as one production line reaches a suitable operating status for the production of bundles of printed products.

5. A method according to claim 4, wherein:
    in response to the enable signal of the first production line the production signal for the other production line is generated, if the ready signal was generated for the other production line and a bundle of printed products that can be produced with it is still required for the shipment according to shipment data that are updated according to the production status during the production of the bundles of printed products.

6. A method according to claim 5, wherein the production signal is generated for the one among the available other production lines, for which the ready signal during the generation of the enable signal exists for the longest period of time.

7. A method according to claim 1, wherein the bundles of printed products corresponding to the consolidated orders is simultaneously produced for at least two shipments and are loaded on the loading stations that are allocated to these shipments.

8. A method according to claim 1, wherein a visual display is generated that represents the production and/or loading status of the bundles of printed products of the consolidated orders corresponding to at least one shipment.

9. A method according to claim 1, wherein a reference product is determined from the printed products of one shipment and that the bundles of printed products of the consolidated order which correspond to the reference product are produced and loaded first.

10. A device for implementing a method according to claim 1, with
    at least two production lines that can he operated independently for producing bundles of printed products consisting of printed products; and
    a control device that can be operated for controlling the production lines, wherein the control device for the automatic determination of the chronological sequence of the production of respectively specified bundles of printed products that belong to a shipment allocated to a means of transportation on a loading station can be operated depending upon the shipment data representing the individual consolidated orders of the shipment.

11. A device according to claim 10, wherein at least one production line can be operated for the production of at least two bundles of printed products consisting of at least two printed products that are distinctive of each other.

12. A device according to claim 10, wherein the chronological sequence can he determined according to a particular sequence that is transmitted by means of an interface of the control device in a sequence specified by the control device.

13. A device according to claim 10, wherein the chronological sequence can be determined depending upon the ready signals representing the availability of the production lines and from the enable signals representing the production status of the bundles of printed products corresponding to the consolidated orders of the shipment.

14. A device according to claim 10, wherein the production lines can be controlled for the simultaneous production of bundles of printed products for at least two shipments.

15. A method according to claim 1, wherein the bundles of printed products consist of printed products of similar types.

* * * * *